July 14, 1970     A. M. MOEN     3,520,481
SWIVEL SPRAY AERATOR
Filed June 10, 1968     2 Sheets-Sheet 1
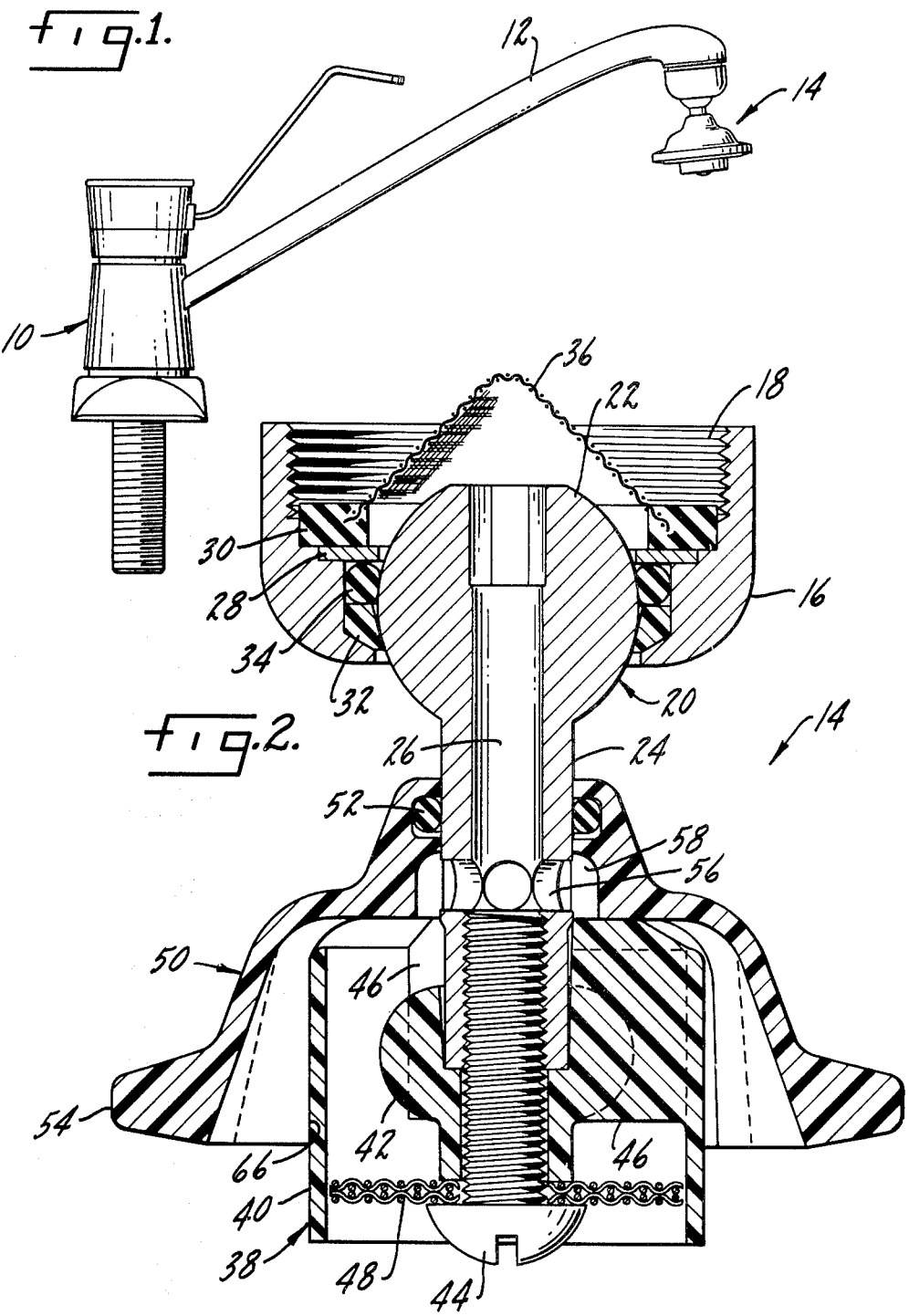
INVENTOR.
Alfred M. Moen
BY Parker & Carter
Attorneys.

INVENTOR.
Alfred M. Moen
BY Parker & Carter
Attorneys.

United States Patent Office 3,520,481
Patented July 14, 1970

3,520,481
SWIVEL SPRAY AERATOR
Alfred M. Moen, 25 Lakeview Drive,
Grafton, Ohio 44044
Filed June 10, 1968, Ser. No. 735,763
Int. Cl. E03c 1/84
U.S. Cl. 239—428.5
8 Claims

ABSTRACT OF THE DISCLOSURE

A combination swivel spray aerator in which the exterior spray forming member is reciprocal between an aerating position and a spray position. The unit comprises a swivel member having a downwardly extending cylindrical portion with a water passage and outwardly extending ports communicating with the water passage. The spray forming member has annularly arranged slots which cooperate with the ports to direct the water either downwardly through the aerating portion of the unit, or outwardly about the aerator and within the spray forming member. The interior surface of the spray forming member has a plurality of grooves, formed at divergent angles to provide a cone-shaped spray discharge.

SUMMARY OF THE INVENTION

This invention relates to a combination swivel spray aerator.

A primary purpose of the invention is to provide a unit of the type described which is reliably constructed and made with a minimum number of parts.

Another purpose is a unit of the type described in which the spray forming member has a plurality of grooves formed at divergent angles to provide a conical shaped spray discharge.

Other purposes will appear in the ensuing specification, drawings and claims.

BRIEF DESCRIPTION OF THE DRAWINGS

The invention is illustrated diagrammatically in the following drawings wherein:

FIG. 1 is a diagrammatic illustration of a faucet having the unit disclosed herein attached thereto, FIG. 2 is an enlarged axial section through the combination swivel spray aerator, showing the unit in the aerating position.

DESCRIPTION OF THE PREFERRED EMBODIMENT

In FIG. 1, a faucet is indicated generally at 10 and may have a spout 12. As shown herein, the faucet is what is known as a kitchen faucet, although obviously the invention can be applied to any faucet. However, kitchen faucets are the most widely used application for swivel spray aerators. Attached at the discharge end of the spout 12 is the swivel spray aerator 14 disclosed herein.

Figure 3:
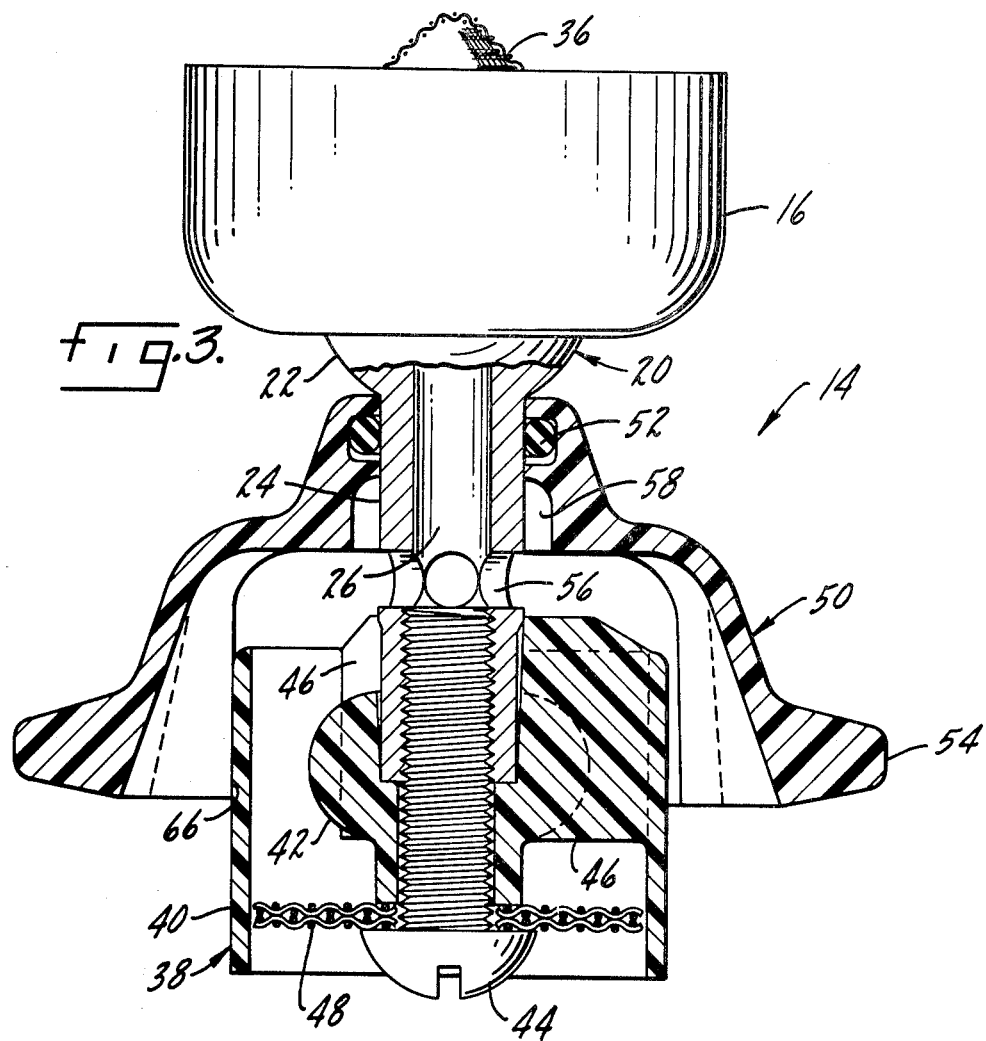
FIG. 3 is an enlarged axial section, similar to FIG. 2, showing the unit in the spray position.

As illustrated in FIGS. 2 and 3, the unit 14 may include a faucet attaching member 16 having interior threads 18 for connecting to the spout. In some applications the member 16 may be threaded on its exterior, and in yet other an adapter may be used for connection to the spout.

Mounted within the attaching member 16 is a swivel member indicated generally at 20 and including an upper generally spherical portion 22. Below the spherical portion 22 is a generally cylindrical etxension 24. A generally central water passage 26 is formed within the swivel member 20.

The swivel member 20 may be held in position in the attaching member 16 by means of a washer 28, a seal ring 30 at its upper end, and an adapter member 32 and a second seal ring 34 generally at the midpoint of the swivel portion 22. The manner of attaching the swivel portion 22 to the member 16 may vary. What is important is to provide a positive seal as well as free movement of the swivel member. Positioned above the entrance to the water passage 26 is a cone-shaped screen 36. The lower end of the cone-shaped screen 36 may be embedded within the seal 30. It is preferred that the angle of the cone-shaped screen 36 be somewhat steep so that the screen is self-cleaning.

Attached at the lower end of the cylindrical extension 24 is an aerating unit indicated generally at 38. The unit 38 includes an outer cylindrical member 40 and a ball-like member 42. The entire unit may be mounted by a screw or the like 44. There are a plurality, for example three, webs 46 connecting the ball-like member 42 and the cylinder 40 to provide integral strength and support. At the lower end of the ball-like member 42 there may be a plurality, for example two, screens 48 which are attached by means of the screw 44. The ball-like member 42 and the screens 44 are generally conventional in aerating units.

Reciprocal on the cylindrical extension 24 is a somewhat conical spray forming member indicated generally at 50. A seal 52 may be positioned between the upper end of the spray forming member 50 and the exterior surface of the cylindrical extension 24. There may be a gripping portion or handle 54 at the lower end of the spray forming member. The cylindrical extension 24 may have a plurality, for example four, radially extending ports 56 in communication with the water passage 26. The ports 56 may be in communication with a plurality, for example eight, slots 58. The slots 58, in the aerating position of FIG. 2, are effective to direct the downwardly moving water into the aerating portion of the unit, or within the cylinder 40. The water will thus pass through the screen 48 to form an aerated discharge.

Figure 4:
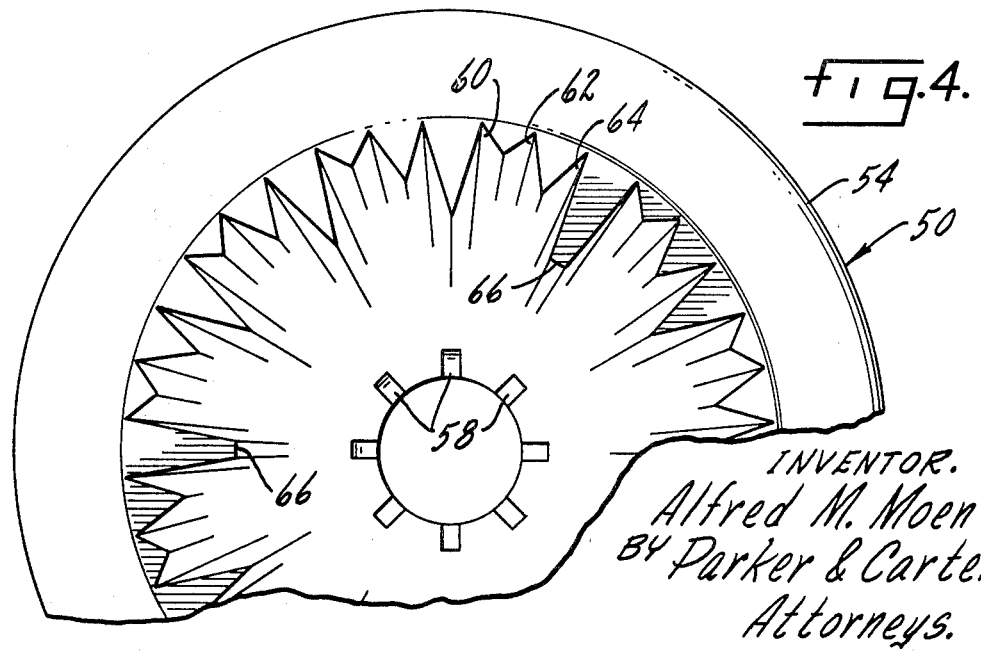
FIG. 4 is an enlarged partial bottom view of the spray forming member.

The interior surface of the spray forming member 50 may have a plurality of slots, shown particularly in FIG. 4. These slots or grooves are formed at varying or divergent angles. For example, there may be three equal numbered sets of grooves indicated at 60, 62 and 64. In effect there are three divergent cones, one cone being made up of the slots 60, another cone being made up of slots 62, and a third cone made up of slots 64. In the aerating position of FIG. 2, the downwardly directed water passing within the cylinder 40, will draw air upwardly through the slots 60, 62 and 64, much in the manner shown in my earlier Pat. 3,334,818. The air will mix with the water to form an aerated discharge.

FIG. 3 illustrates the unit in the spray position. It should be noted that in this position the slots 58 no longer direct water downwardly within the cylinder 40, but, on the contrary, the water passing outwardly through the ports 56 will flow between the exterior of the cylinder 40 and the interior of the spray forming member 50. In this case, the water will be discharged through the grooves 60, 62 and 64. Because the grooves are at divergent angles, three different cone sprays will be formed. Water pressure and the particular disposition of the ports 56 will direct the water to the exterior of the cylinder 40.

There may be a plurality, for example three, ridges 66 formed on the interior of the spray forming member 50, which will bear against the exterior of the cylinder 40, as illustrated in FIG. 3, for additional support of the spray forming member.

The use, operation and function of the invention are as follows:

When the combination swivel spray aerator is in the position of FIG. 2, all water passing downwardly through passage 26 will be directed outwardly through ports 56 and then downwardly by slots 58 into the interior of the cylinder 40. The water will then strike the ball-like member 42, be broken up into minute sprays, after which it will flow through the screens 48. Air is drawn upwardly through the slots about the interior of the spray forming member to mix with the water within the cylinder 40 to form an aerated discharge.

When the spray forming member has been reciprocated upwardly, to the spray position of FIG. 3, water directed outwardly through ports 56 will pass about the exterior of the cylinder 40, and downwardly through the grooves 60, 62 and 64 to thus form cone-shaped spray discharges.

The spherical section 22 provides a swivel means so that the discharge, whether it be an aerated discharge or a spray, may be directed to any point within the sink.

The various parts making up the unit may be formed of metal, or of plastic. The invention should not be liimted to any particular material. In like manner, the invention should not be limited to the precise construction and disposition of parts as shown herein.

Of importance are the webs which provide support for the cylinder 40 and the ridges 66 which provide bearing support for the spray forming member 50. When the unit is swiveled, by using the gripping area 54, there is complete contact and support between all of the members and thus not possibility of distorting or breaking any portion of the unit.

What is claimed is:

1. In a combination spray and aerator for attachment to a faucet, faucet mounting means having a water passage therein, a swivel member having a generally central water passage in alignment with the water passage in the mounting means, means for attaching the swivel to said mounting means, a cylindrical member attached adjacent one end of said swivel member, port means in said swivel member in communication with its water passage and upstream from said cylindrical member, means within said cylindrical member for forming an aerated water discharge, and a reciprocal spray forming member mounted on said swivel member and at least partially enclosing said cylindrical member, said spray forming member being movable between an aerating position in which it directs water from said ports downwardly into said cylindrical member and a spray position in which water from said ports is directed horizontally beyond the cylinder member, then downwardly adjacent the inner surface of the spray forming member.

2. The structure of claim 1 further characterized in that said swivel member includes a generally cylindrical extension, upon which said cylindrical member is mounted.

3. The structure of claim 2 further characterized by and including a ball-like member positioned at the downstream end of the cylindrical extension of the swivel member and within said cylindrical member, and at least one screen attached to the downstream side of said ball-like member.

4. The structure of claim 3 further characterized by and including a plurality of radially extending web members connecting said cylindrical member and said ball-like member.

5. The structure of claim 1 further characterized by and including a plurality of upwardly and inwardly extending grooves on the interior surface of said spray forming member, said grooves providing a passage for air when said spray forming member is in an aerating position, with said grooves providing a passage for downwardly directed water when said spray forming member is in the spray position.

6. The structure of claim 5 further characterized in that the grooves on the interior surface of said spray are formed at divergent angles to provide a water spray discharge having divergent individual sprays.

7. The structure of claim 5 further characterized by and including a plurality of inwardly extending ribs on the interior surface of said spray forming member, said ribs bearing against the exterior of said cylindrical member for supporting said spray forming member.

8. The structure of claim 1 further characterized by and including a plurality of slots in said spray forming member, said slots being in alignment with said ports when the spray forming member is in an aerating position to thereby direct water downwardly through said cylindrical member, with said slots being positioned on the upstream side of said ports when said spray forming member is in the spray position.

References Cited

UNITED STATES PATENTS

| | | | |
|---|---|---|---|
| 2,935,265 | 5/1960 | Richter | 239—428.5 X |
| 2,989,249 | 6/1961 | Richter | 239—460 X |
| 2,990,122 | 6/1961 | Blumberg et al. | |
| 3,334,818 | 8/1967 | Moen | 239—428.5 |

M. HENSON WOOD, Jr., Primary Examiner

M. Y. MAR, Assistant Examiner

U.S. Cl. X.R.

239—456, 460